United States Patent [19]
Yokozeki et al.

[11] Patent Number: 5,216,219
[45] Date of Patent: Jun. 1, 1993

[54] DISK MANUFACTURING APPARATUS

[75] Inventors: Shinichi Yokozeki; Teruo Toma, both of Saitama, Japan

[73] Assignee: Pioneer Electronic Corporation, Tokyo, Japan

[21] Appl. No.: 794,053

[22] Filed: Nov. 19, 1991

[30] Foreign Application Priority Data

| May 10, 1991 | [JP] | Japan | 3-106071 |
| May 10, 1991 | [JP] | Japan | 3-106072 |
| May 10, 1991 | [JP] | Japan | 3-106073 |

[51] Int. Cl.$^5$ .............................................. B23K 15/00
[52] U.S. Cl. ......................... 219/121.19; 219/121.21; 346/110 V
[58] Field of Search .................. 219/121.19, 121.20, 219/121.21, 121.12, 121.13; 346/110 V

[56] References Cited

U.S. PATENT DOCUMENTS

| 4,406,939 | 9/1983 | Golker | 219/121.69 |
| 4,647,947 | 3/1987 | Takeoka et al. | 346/76 L X |
| 4,651,171 | 3/1987 | Tarnowski | 346/110 V |
| 5,096,563 | 3/1992 | Yoshizawa et al. | 205/68 |
| 5,120,927 | 6/1992 | Williams et al. | 219/121.68 |

FOREIGN PATENT DOCUMENTS 2-267733 11/1990 Japan .

Primary Examiner—C. L. Albritton
Attorney, Agent, or Firm—Keck, Mahin & Cate

[57] ABSTRACT

A disk manufacturing apparatus produces a master disk of optical disks with a high recording density in a short time. According to one aspect, the apparatus comprises a housing forming a vacuum space; a holder holding a master disk having a recording surface subjected to an electron beam resist application process in the housing; a plurality of cold-cathode emitter elements, arranged two-dimensionally within a plane of beam irradiation to the master disk, irradiating an electron beam toward the master disk of optical disks when driven; and a driver selectively driving the a plurality of cold-cathode emitter elements. According to another aspect, the apparatus comprises at least one cold-cathode emitter element irradiating an electron beam toward the master disk when driven; a magnetic field lens, disposed between the cold-cathode emitter element and the master disk, focusing the electron beam emanated from the cold-cathode emitter elements. According to a further aspect, the apparatus comprises a turntable rotating the master disk in the housing; a head having at least one cold-cathode emitter element, when driven, irradiating an electron beam toward the master disk; and a driver driving the cold-cathode emitter element in accordance with a supplied record information signal.

9 Claims, 7 Drawing Sheets

DISK MANUFACTURING APPARATUS

BACKGROUND OF THE INVENTION

1. Field of the Invention

The present invention relates to an apparatus for manufacturing an information carrier. More particularly, to a disk manufacturing apparatus in which a recording beam is irradiated on the surface of a master disk of optical disks for the purpose of recording of information, for use in a mastering process of producing a master disk of optical disks.

2. Description of Background Information

As an example of video or audio information recording system using a disk-shaped recording medium, there is an optical recording system for optically recording the information on a master disk of video disks. This system is configured to irradiate a laser beam focused into a minute spot for exposure on a photoresist film of 1000 to 1500 angstroms thick formed on a glass disk serving as a substrate of the master disk, in a so-called bit-by-bit method to blink the beam in accordance with video or audio information. The irradiated disk is then developed to provide a series of pits (recesses), wherein information is recorded in the form of the length of each pit and its repeating interval.

In the optical disk mastering process described above, since the surface of a photoresist master disk is traced by one or several laser beams to record information while the disk is rotating, the entire track length must be traced continuously. This, however, takes a long time. Additionally, since a laser beam is used to expose the photoresist layer of the master disk, it is difficult to provide a very minute beam spot because of the optical limitation. For these reasons, higher recording density cannot easily be achieved with the conventional photoresist master disk.

SUMMARY OF THE INVENTION

It is therefore an object of the present invention to provide a disk manufacturing apparatus capable of manufacturing a master disk of optical disks with a higher recording density in a short period of time.

A disk manufacturing apparatus according to one aspect of the present invention comprises a housing forming a vacuum space; holding means for holding a master disk of optical disks having a recording surface subjected to an electron beam resist application process in the housing; a plurality of cold-cathode emitter elements, arranged two-dimensionally within a plane of beam irradiation to the master disk, for irradiating an electron beam toward the master disk when driven; and a drive means for selectively driving the a plurality of cold-cathode emitter elements.

The disk manufacturing apparatus is configured to hold a master disk of optical disks having a recording surface, subjected to an electron beam resist application process, in the vacuum housing, and to cause the drive means to selectively drive the plurality of cold-cathode emitter elements arranged two-dimensionally on a plane of beam irradiation on the master disk, thereby performing a mastering process.

A disk manufacturing apparatus according to another aspect of the present invention comprises a housing forming a vacuum space; holding means for holding a master disk of optical disks having a recording surface subjected to an electron beam resist application process in the housing; at least one cold-cathode emitter element for irradiating an electron beam toward the master disk of optical disks when driven; a magnetic field lens, disposed between the cold-cathode emitter element and the master disk, for focusing the electron beam being emanated from the cold-cathode emitter elements; and drive means for driving the cold-cathode emitter element.

The disk manufacturing apparatus described above is configured to hold the master disk of optical disks having a recording surface, subjected to an electron beam resist application process, in the vacuum housing, to converge an electron beam being emanated from the at least one cold-cathode emitter element driven by the drive means, by the magnetic field lens located between the cold-cathode emitter element and the master disk, and to irradiate the converged beam on the master disk.

A disk manufacturing apparatus according to a further aspect of the present invention comprises a housing forming a vacuum space; holding means for holding a master disk of optical disks having a recording surface subjected to an electron beam resist application process in the housing; at least one cold-cathode emitter element for irradiating an electron beam toward the master disk of optical disks when driven; voltage applying means for applying a voltage to the master disk of optical disks; and drive means for driving the cold-cathode emitter element.

This disk manufacturing apparatus is configured to hold a master disk of optical disks having a recording surface subjected to an electron beam resist application process in the vacuum housing, to cause the voltage applying means to apply a voltage to the master disk, and to permit an electron beam being emanated from at least one cold-cathode emitter element driven by the drive means to be irradiated on the master disk.

A disk manufacturing apparatus according to a still further aspect of the present invention comprises a housing forming a vacuum space; a turntable for rotating a master disk of optical disks in the housing; a head having at least one cold-cathode emitter element for irradiating, when driven, an electron beam toward the master disk; and drive means for driving the cold-cathode emitter element in accordance with a supplied record information signal.

This disk manufacturing apparatus is configured to cause the turntable to rotate the master disk in the vacuum housing, and to permit the master disk of optical disks to be scanned and irradiated with an electron beam by means of the head having at least one cold-cathode emitter element which is driven by the drive means in accordance with a supplied record information signal.

BRIEF DESCRIPTION OF THE INVENTION

DETAILED DESCRIPTION OF THE PREFERRED EMBODIMENTS

Figure 1:
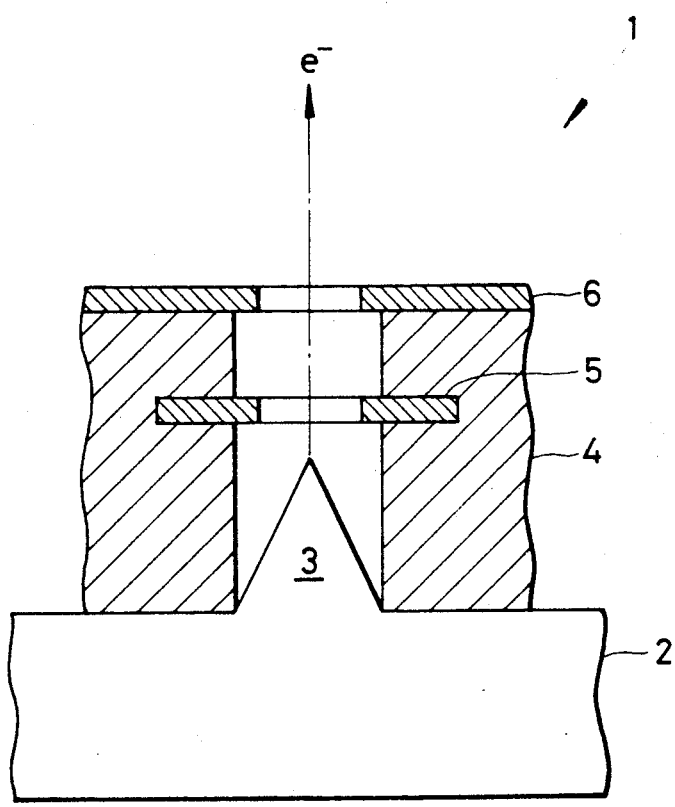
FIG. 1 is a diagram generally showing a cold-cathode emitter element employed in the present invention.

FIG. 1 exemplarily shows the general structure of a cold-cathode emitter element.

In FIG. 1, a cold-cathode emitter element 1 has a conical field radiating emitter 3 formed by anisotropic etching of an Si (100) substrate 2, and an insulating layer 4 of, for example, $SiO_2$, laminated in a columnar shape on the main surface of the Si substrate 2. An electrode layer 5 serving as a gate to the emitter 3 is provided between laminas of the insulating layer 4, with an electrode layer 6 serving as an anode laminated on the top of the insulating layer 4. These electrode layers 5 and 6 are formed of Mo, W, Ta or the like, into a columnar shape with a slightly smaller inner diameter than that of the insulating layer 4.

The emitter element 1 with such an open cavity structure maintains a vacuum state at least between the emitter 3 and the anode 6, and emits electrons $e^-$ toward the anode 6 from the emitter 3, which is a cathode, when a high potential is applied to the anode. The electrons $e^-$ are controlled by the gate 5 so that a part of the electrons enters the gate 5 while most of the remaining electrons pass through the gate 5 and further through the anode 6. In this manner the cold-cathode emitter element 1 functions like a vacuum triode element.

An electron beam is acquired from this emitter element 1 by keeping the external space in a vacuum state, designing the target for the beam emission in such a way as to induce emitted electrons $e^-$, and operating the emitter element 1 as a minute electron gun. The emitter element 1 has such a feature that the inner diameter of the anode 6 can be set 1 $\mu m$ or smaller to thereby significantly shorten the traveling time of the emitted electrons.

Figure 2:
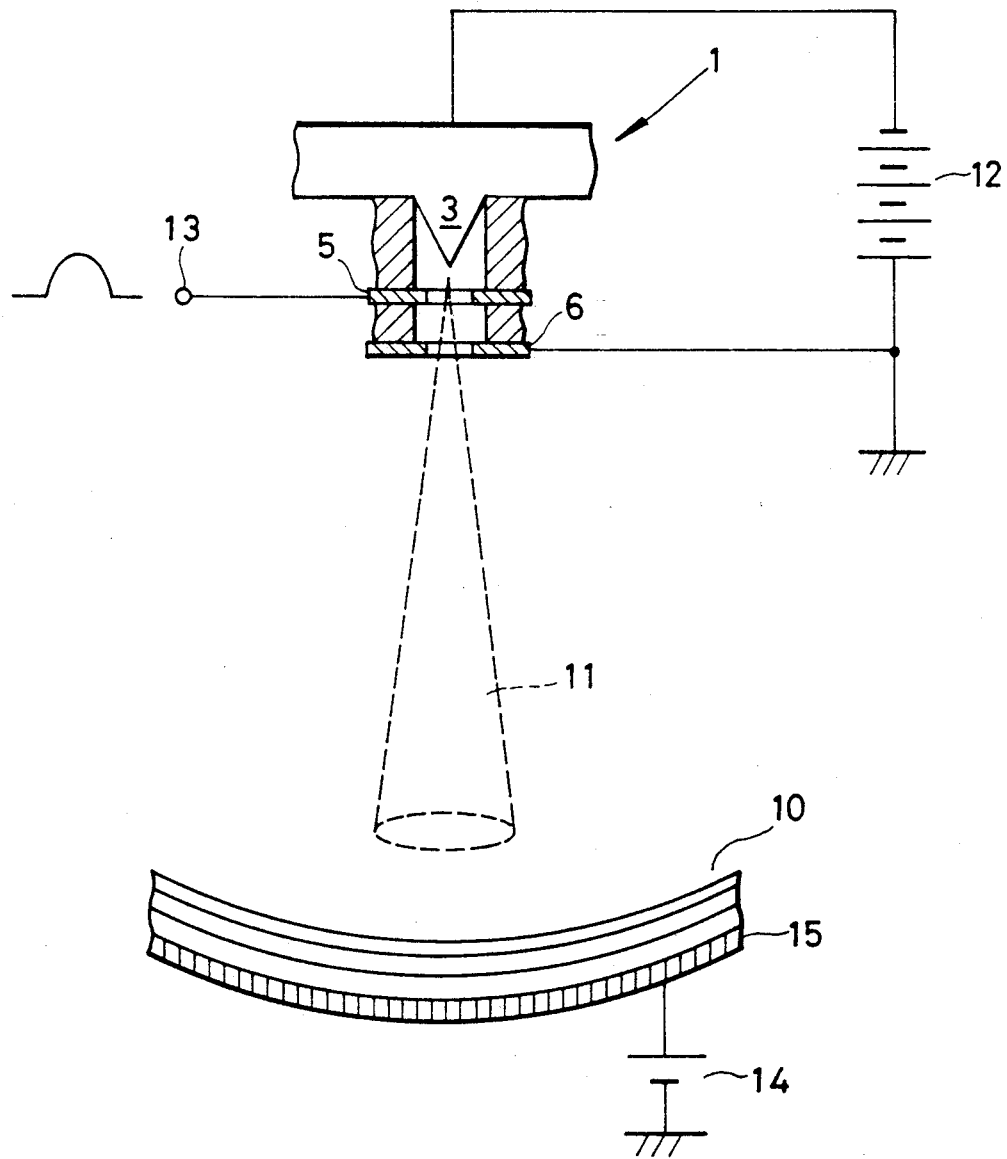
FIG. 2 is a diagram showing the principle of mastering process for producing a master disk of optical disks using a cold-cathode emitter element.

FIG. 2 schematically shows how to cut a master disk of optical disks using this cold-cathode emitter element 1.

Referring to the diagram, a master disk 10 is placed facing the code-cathode emitter element 1 in a housing (not shown) having a vacuum space, and an electron beam 11 to be emitted can be irradiated at any position on the recording surface of the master 10. A constant voltage source 12 applies negative and positive potentials respectively to the emitter 3 and the anode 6, and provides electrons that are emitted from the emitter 3 in accordance with a record signal supplied to the gate 5 from an input terminal 13.

The master 10 is coated with an electron beam resist material, such as PMMA (Poly Methyl Methacrylate), which is sensitive to an electron beam. The master 10 may have an electrode layer, or a support for fixing the master 10, if an electrode layer is not provided, used as an electrode, so that a predetermined positive voltage is applied to this electrode portion 15 by a constant voltage source 14. This electrode portion 15 serves as a so-called collector to absorb electrodes with respect to the cold-cathode emitter element 1.

As long as the gate 5 of the cold-cathode emitter element 1 holds a predetermined voltage, electrons are hardly emitted from the emitter 3 so that electron emission can be enabled or disabled by a so-called binary signal in the record signal. Further, the target or master disk 10 side acts as a collector to collect the emitted electrons. It is therefore possible to irradiate an electron beam toward the master disk 10 with an approximately linear radiation axis, as well as to blink an electron beam spot to form pits on the master disk 10.

In cutting such a master disk of optical disks, the electron beam from the cold-cathode emitter element 1 does not converge but diverges to thereby form a large electron beam spot on the master disk 10, preventing the acquired optical disks from having a high recording density. In the case where a plurality of cold-cathode emitter elements 1 are used in the cutting process, if these emitter elements are arranged in high density, crosstalk between the adjoining elements would occur.

Figure 3:
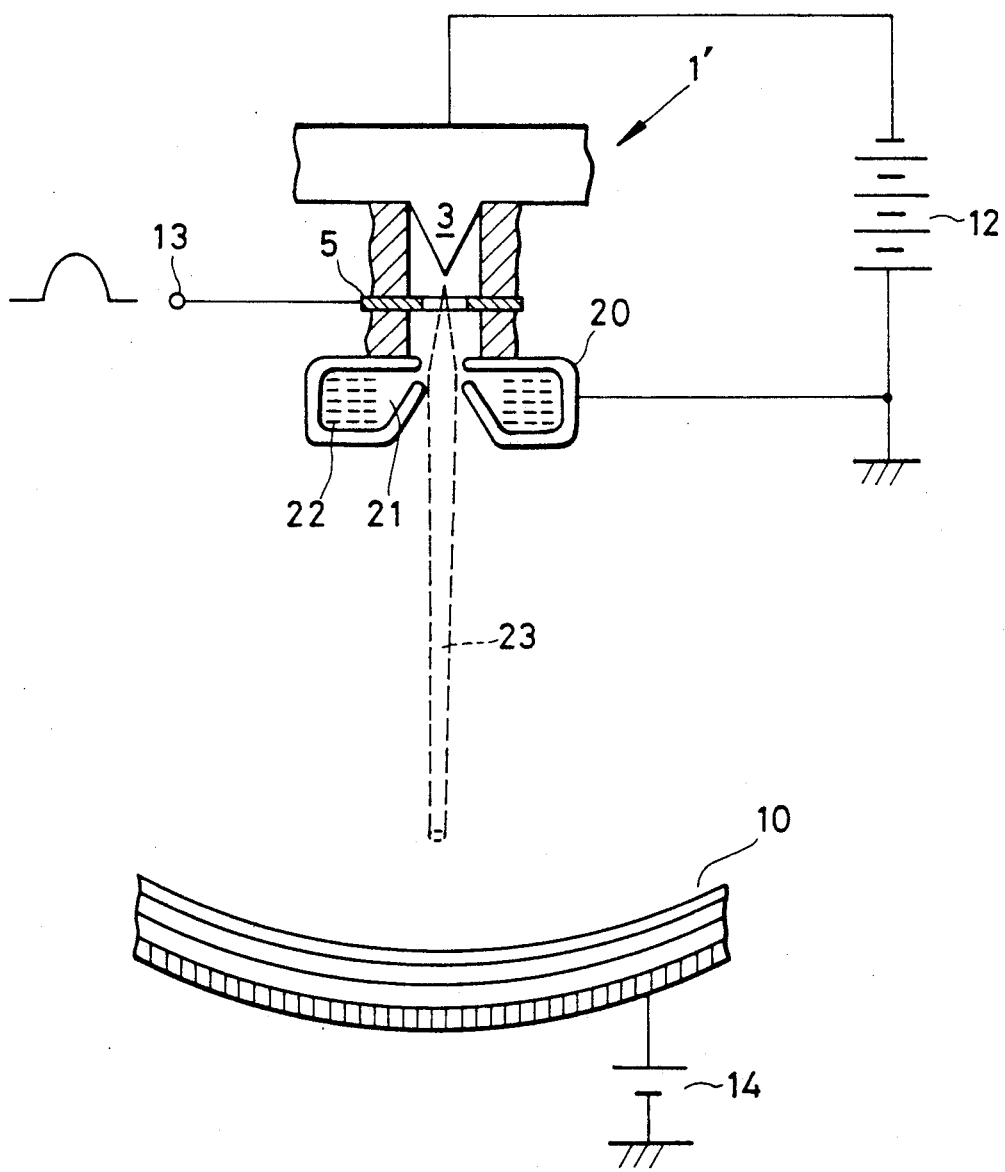
FIG. 3 is a diagram showing the principle of mastering process for producing a master disk of optical disks in a first embodiment of the present invention.

FIG. 3 is a diagram for explaining a first embodiment designed in view of the trouble arising from the high-density arrangement of the cold-cathode emitter elements. In this embodiment the anode 6 in FIG. 2 is replaced with a modified one.

In FIG. 3 the same reference numerals as used in FIG. 2 are used to specify the identical or corresponding components. An anode 20 in this embodiment is so shaped as to enclose a magnetic field lens 21 having a print coil 22 wound therein. The magnetic field lens 21 is a deflection means to determine the directivity of an electron beam, and does not differ much in principle from a well-known deflection circuit.

In the thus constituted cold-cathode emitter element 1', unlike the electron beam 11 in FIG. 2, an electron beam 23 from the emitter 3 can converge in accordance with the inductance characteristic of the magnetic field lens 21.

The converged electron beam 23 is to be irradiated as a minute spot on the master disk 10, thus yielding a master disk of optical disks with a high recording density. This electron beam 23 can be made so thin to prevent crosstalk even with the high-density arrangement of the cold-cathode emitter elements.

As a so-called electron beam lithography technique, there is an electron beam exposure technique such as EBES (Electron Beam Exposure System) for providing a semiconductor integrated circuit. Application of this technique to the process of providing a master disk of optical disks will involve the problem of a small amount of current and a slow information recording speed (slow transfer rate).

Figure 4:
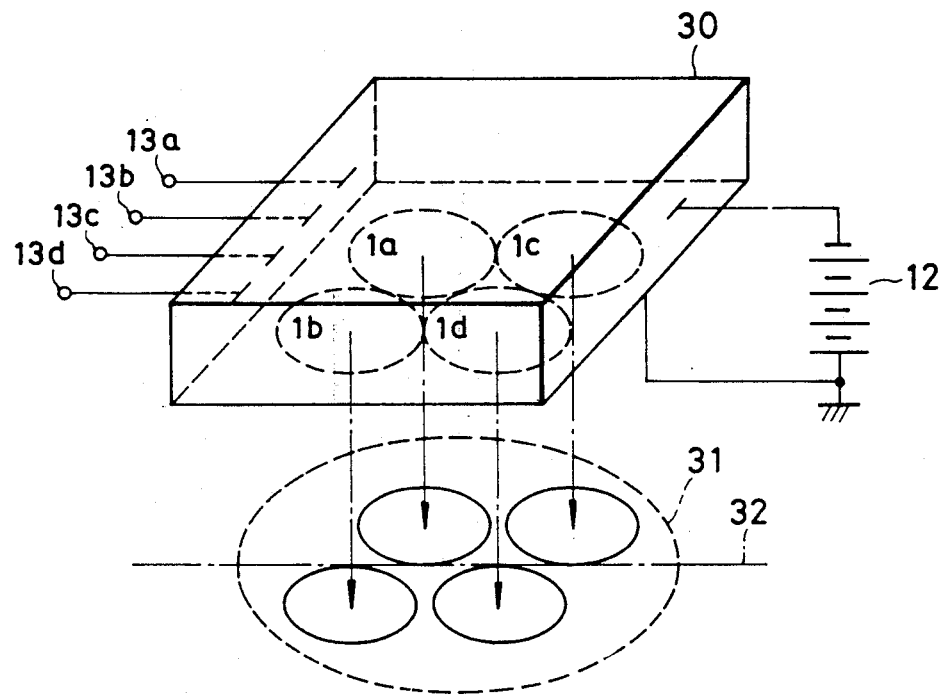
FIG. 4 is a diagram for explaining the structure of a recording head in a second embodiment of the present invention.

FIG. 4 illustrates a second embodiment developed to overcome this shortcoming, and schematically shows a recording head comprising a plurality of cold-cathode emitter elements. FIG. 4 also uses the same reference numerals as used in FIGS. 1 through 3 to identical or corresponding components.

Referring to FIG. 4 four cold-cathode emitter elements 1$a$, 1$b$, 1$c$ and 1$d$ are arranged in a unit constituting a recording head 30 in such a way that the center of each cold-cathode emitter element (distal end of the emitter) defines the associated corner of a square. As the electron beam from each cold-cathode emitter element is thin and does not cause crosstalk as described previously, the cold-cathode emitter elements can be arranged close to one another in the unit.

The cold-cathode emitter elements have their emitters commonly applied with a negative potential by the constant voltage source 12, and their gates respectively connected to input terminals 13a, 13b, 13c and 13d from which record signals enter. Those cold-cathode emitter elements are separately controlled by four record signals respectively supplied to the gate input terminal 13a and 13d.

Figure 5:
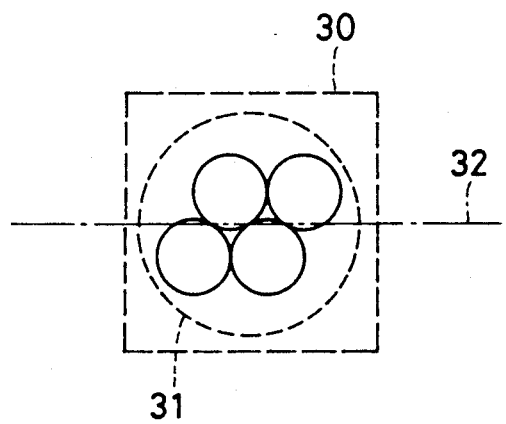
FIG. 5 is a diagram for explaining a modification of the second embodiment.
Figure 6:
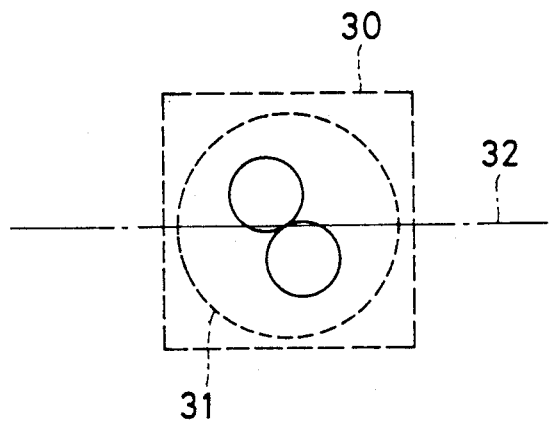
FIG. 6 is a diagram for explaining another modification of the second embodiment.

When a master disk of optical disks placed on a turntable is rotated under the control of a spindle servo system, with the recording head 30 tracing on a track 32 as done in the prior art, four pits can be recorded at a time as a matter of course while an electron beam spot or recording pit formed by each electron beam can be made sufficiently small. It is therefore possible to form recording pits suitable for a system that places a plurality of recording pits in a single read light spot 31 (FIG. 4) to read four recording pits at a time, as disclosed in, for example, Japanese Patent Application Laid Open No. 2-267733. The arrangement and the number of the individual recording pits and those of the cold-cathode emitter elements are limited to what has been described above. For instance, the cold-cathode emitter elements may easily be arranged so as to form an equilateral triangle (shown in FIG. 5) as also described in the above patent publication, or make configuration of two recording pits arranged to form such an equilateral triangle (shown in FIG. 6).

In addition, it is easy to arrange cold-cathode emitter elements, corresponding in quantity to recording tracks, in a line to constitute a recording head.

Figure 7:
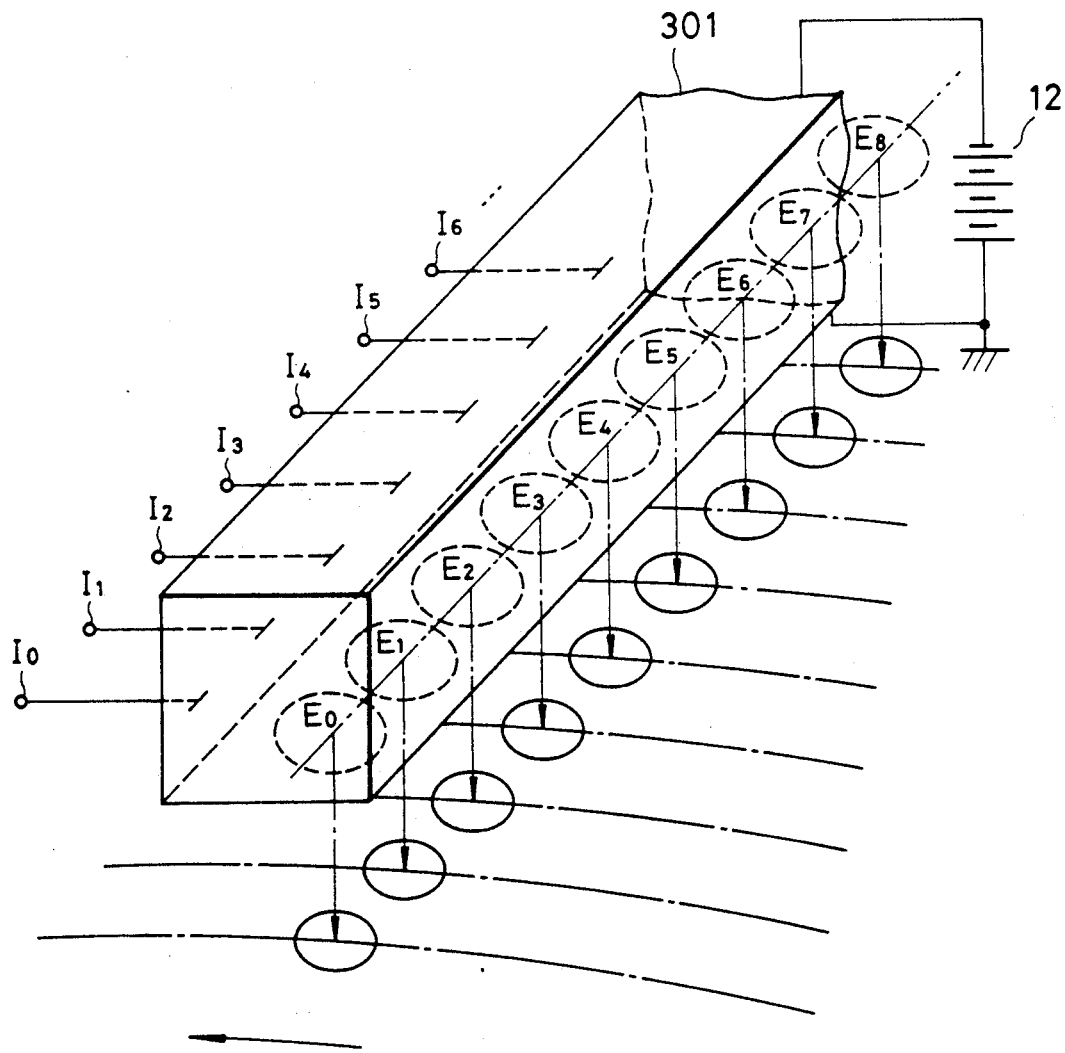
FIG. 7 is a diagram for explaining the structure of a linear recording head array according to the second embodiment.
Figure 8:
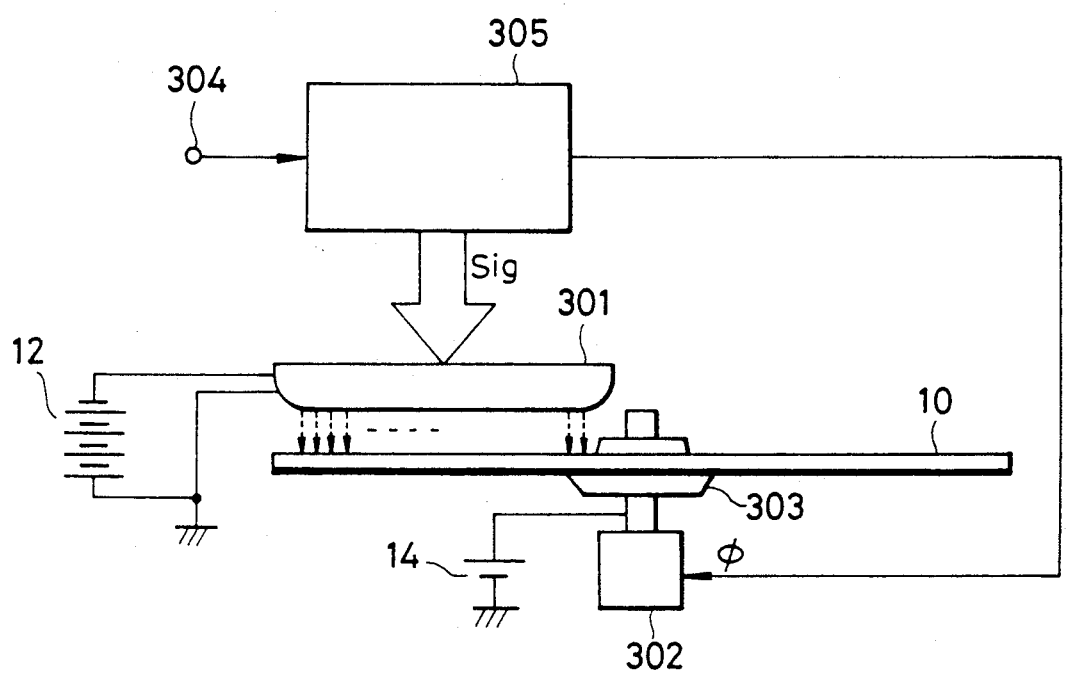
FIG. 8 is a principle diagram of how to provide a master disk of optical disks using the linear recording head array shown in FIG. 7.

FIGS. 7 and 8 are diagrams for explaining the process of providing a master disk of optical disks using this linear recording head array. These diagrams use the same reference numerals as used in FIGS. 1 through 3 to denote identical or corresponding components. Referring to FIG. 7, a linear recording read array, 301 includes cold-cathode emitter elements $E_i$ (i=0, 1, 2, ..., w: (w−1) being the number of tracks) by at least the number of tracks to be recorded. These cold-cathode emitter elements $E_i$ are arranged in a line with given track intervals. Like those in the recording head in FIG. 4, the cold-cathode emitter elements E: have their emitters commonly applied with a negative voltage from the constant voltage source 12, and their gates respectively connected to input terminals $I_i$. The emitter elements $E_i$ are separately controlled by drive signals which are supplied to the respective signal input terminals $I_i$.

With the thus constituted linear recording head array 301 fixed above the master disk 10 in its radial direction, while the master disk of optical disks 10 makes one revolution in the direction of the arrow in FIG. 7, cutting of one master is completed.

FIG. 8 illustrates the general structure of the optical disk manufacturing apparatus.

In this figure, the master disk 10 is placed on a turntable 303 which is rotated by a motor 302. The master disk 10 is applied with a positive voltage by the constant voltage source 14, while the linear recording head array 301 is fixed above and in the radial direction of the main surface of the master disk 10.

A record information signal is supplied to a scan controller 305 through an input terminal 304. The scan controller 305, which comprises a microcomputer, a shift register, a driver, a timing signal generator and a memory, performs a predetermined process to drive the linear recording head array 301 to scan the top of the master disk 10 with electron beams in accordance with the record information signal. More specifically, the scan controller 305 supplies drive signals to those of signal lines of the linear recording head array 301 via the input terminals $I_i$ which are selected to specify tracks to be irradiated with the electron beams, while supplying to the motor 302 a so-called angle signal $\phi$, which corresponds in terms of time to the drive signals and specifies the recording position in the track direction to be irradiated.

As a result, the motor 302 rotates by an angle corresponding to the angle signal $\phi$ to determine the relative radial position of the master disk 10 to the recording head array 301, and the head array 301 emits electron beams in accordance with the drive signals. Since cutting of the master disk of optical disks is completed by rotating the master disk one round, the recording time can significantly be shortened.

According to the second embodiment, as a plurality of cold-cathode emitter elements which each provide a thin electron beam are used to constitute a recording head, it is possible to improve the recording density or recording capacity with a relatively simple structure by a mastering method not differing much from the conventional method as well as to provide a large current from the recording head. The second feature contributes to improve the transfer rate.

Figure 9:
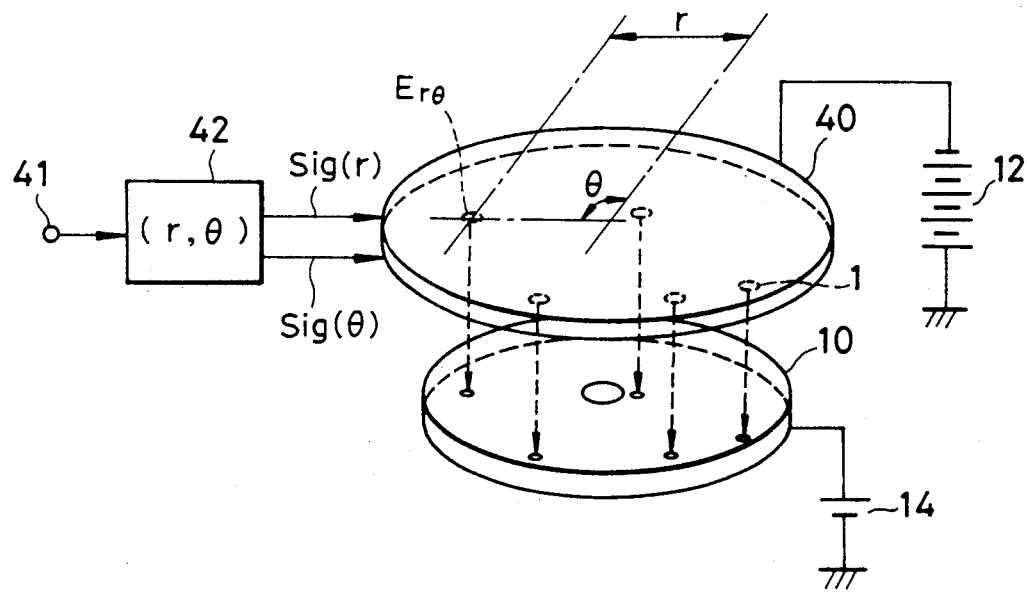
FIG. 9 is a principle diagram of how to provide a master disk of optical disks according to a third embodiment of the present invention.

FIG. 9 illustrates a third embodiment designed to further shorten the recording time, and presents a diagram showing the principle of production a master disk of optical disks.

FIG. 9 uses the same reference numerals as used in FIGS. 1 through 3 to denote identical or corresponding components. According to this embodiment, a master disk of optical disks is cut by a so-called electron beam source panel constituted of a two-dimensional arrangement or distribution of a number of cold-cathode emitter elements.

Figure 10:
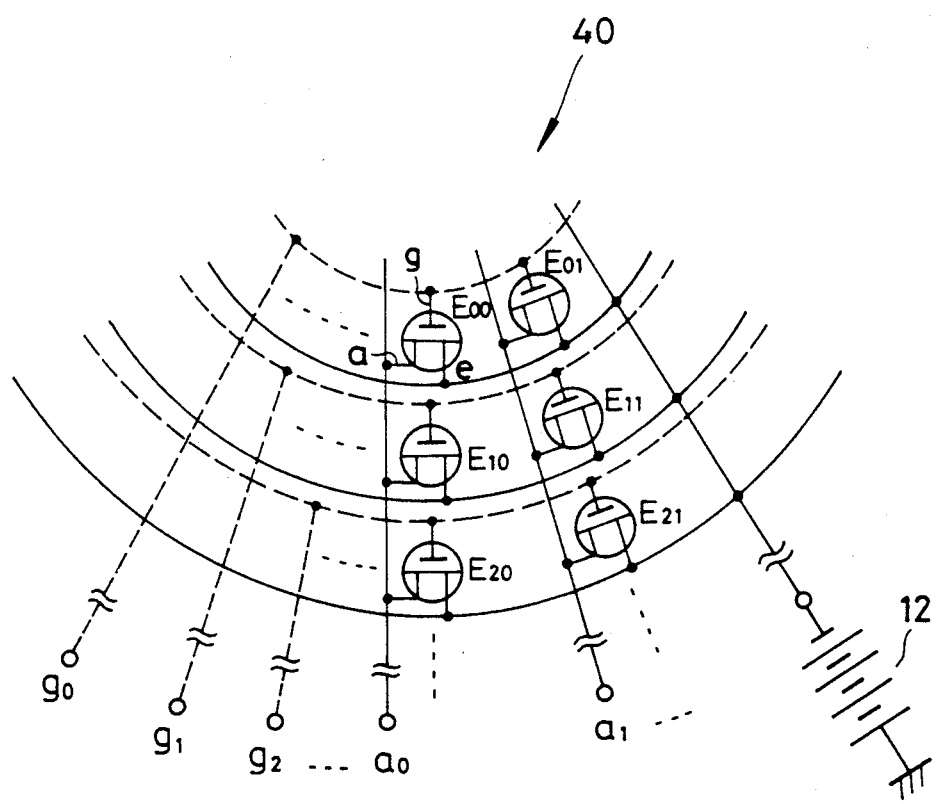
FIG. 10 is a diagram for explaining the wiring of elements in an electron beam source panel according to the third embodiment.

In such an electron beam source panel 40, the cold-cathode emitter elements whose quantity is sufficient to provide at least the required recording capacity of target disk are arranged in a spiral or concentric form, for example. FIG. 10 exemplifies a wiring of the emitter elements.

In FIG. 10 it is assumed that the cold-cathode emitter elements $E_{r\theta}$ (r=0, 1, 2, ..., n; and $\theta$=0, 1, 2, ..., m) are arranged concentrically on the surface of the inner layer of the electron beam source panel 40, and that all the emitters e of these elements are commonly applied with a negative potential by the constant voltage source 12. Gates g of those emitter elements which are arranged on the circle with the same radius in the electron beam source panel 40, i.e., the gates g of the emitter elements $E_{0\theta}$, $E_{1\theta}$, $E_{2\theta}$, ..., or $E_{n\theta}$, are commonly connected. The common connection lines are respectively led to input terminals $g_0$, $g_1$, $g_2$, ..., $g_n$. Anodes a of those emitter elements which are arranged in the same radial direction, for example, the anodes a of $E_{r0}$, $E_{r1}$, ..., or $E_{rm}$, are commonly connected. The common connection lines are respectively led to input terminals $a_0$, $a_1$, ..., $a_m$. It is to be noted that "n" is the number of the emitter elements aligned in the radial direction, and "m" is the number of the emitter elements aligned in the circumferential direction; the total number of cold-cathode emitter elements in the electron beam source panel 40 is $(n-1) \times (m-1)$.

When a record information signal is supplied through an input terminal 41, a scan controller 42 as shown in FIG. 9 sequentially processes the signal and supplies radius information and angle information for those elements of the electron beam source panel 40 to be driven to this panel 40. More specifically, the scan controller 42 acquires the value of r representing the radius information and the value of $\theta$ representing the angle information based on the supplied record information signal, and applies the drive signals to the input terminals $g_r$ and $a_\theta$ of the electron beam source panel 40. Then, the drive signal is supplied to the input terminal $a_\theta$ as an anode voltage supply terminal and a column of the cold-cathode emitter elements in one radial direction of an angle $\theta$ are selected to be activatable, while the record information signal corresponding to the drive signals is supplied to the input terminal $g_r$ as a gate voltage supply terminal and a row of the cold-cathode emitter elements in one circumferential direction with the radius r are selected to permit the intended beam emission.

When the radial and circumferential groups of the emitter elements are determined, only one cold-cathode emitter elements $E_{r\theta}$ with the radius r from the center and an angle $\theta$ is driven to emit an beam. As this operation of designating those input terminals $g_r$ and $a_\theta$ is performed serially, the record information signal can be transferred at a high speed, and the transferred record information signal can instantaneously be converted into an electron beam in the electron beam source panel 40. This way can permit record information to be electrically recorded, thereby ensuring the formation of recording pits in a short recording period.

The driving of the electron beam source panel as done in the third embodiment may or course be achieved by another method. The present invention is not limited to optical disks, but may be applied to a process of providing an optical card master. The linear recording head array as explained referring to FIG. 7 is particularly advantageous in such application.

As described above, according to first aspect of the present invention, predetermined voltages are applied to the emitters and anodes of many cold-cathode emitter elements for emitting electron beams from the emitters in vacuum arranged two-dimentionally in the electron beam source panel, and the cold-cathode emitter elements are separately driven by the drive means in accordance with a record information signal to irradiate many electron beams on a fixed master disk of optical disks. It is therefore possible to prepare a master disk of optical disks in a short recording (manufacturing) period. This apparatus hardly includes mechanical process elements in providing a master disk, making it possible to form very fine and accurate recording pits.

According to another aspect of the present invention, a predetermined voltage is applied between the emitter and anode of each cold-cathode emitter element in vacuum to emit electrons from the emitter, the electrons are converged by the deflection means provided at the anode, and the converged electron beam is irradiated on a master disk, which has a recording surface subjected to an electron beam resist application process and is applied with a voltage. This arrangement ensures beam emission to the master disk with a high recording density and without causing crosstalk between cold-cathode emitter elements. This deflection means can deflect the converged electron beam so as to permit beam irradiation on any point on the master disk.

According to a further aspect of the present invention, a predetermined voltage is applied in vacuum between the emitter and anode of each of a plurality of cold-cathode emitter elements constituting a recording head, the cold-cathode emitter elements are separately controlled by the drive means in accordance with a record information signal, and the tracks on the master disk are scanned and irradiated with an electron beam in such a way that a plurality of electron beam spots can be positioned within the contour of a read light spot. This arrangement can realize a process of providing a master disk with a high recording density and a large current with a relatively simple structure without requiring considerable alteration of the conventional mastering process. This feature can ensure easy formation of a plurality of recording pits within a read light spot, and can thus contribute to shortening the time to reproduce the recorded signal.

What is claimed is:

1. A disk manufacturing apparatus comprising;
a housing forming a vacuum space;
holding means for holding a master disk of optical disks having a recording surface subjected to an electron beam resist application process in the housing;
a plurality of cold-cathode emitter elements, arranged two-dimensionally within a plane of beam irradiation to the master disk, for irradiating an electron beam toward the master disk when driven; and
drive means for selectively driving the plurality of cold-cathode emitter elements.

2. A disk manufacturing apparatus according to claim 1, wherein the plurality of cold-cathode emitter elements are arranged in a concentric or spiral form in a plane of beam irradiation to the master disk.

3. A disk manufacturing apparatus comprising:
a housing forming vacuum space;
holding means for holding a master disk of optical disks having a recording surface, subjected to an electron beam resist application process, in the housing;
at least one cold-cathode emitter element for irradiating an electron beam toward the master disk when driven;
a magnetic field lens, disposed between the cold-cathode emitter elements and the master disk of optical disks, for focusing the electron beam being emanated from the cold-cathode emitter elements; and
drive means for driving the cold-cathode emitter element.

4. A disk manufacturing apparatus comprising:
a housing forming vacuum space;
holding means for holding a master disk of optical disks having a recording surface, subjected to an electron beam resist application process, in the housing;
at least one cold-cathode emitter element for irradiating an electron beam toward the master disk when driven;
voltage applying means for applying a voltage to the master disk; and
drive means for driving the cold-cathode emitter element.

5. A disk manufacturing apparatus according to claim 3, wherein said cold-cathode emitter elements each have an emitter and an anode between which a predetermined voltage is applied, and a gate between the emitter and the anode, and the drive means controls electrons emitted from the emitter by a signal supplied to the gate.

6. A disk manufacturing apparatus according to claim 4, wherein said cold-cathode emitter elements each have an emitter and an anode between which a predetermined voltage is applied, and a gate between the emitter and the anode, and the drive means controls electrons emitted from the emitter by a signal supplied to the gate.

7. A disk manufacturing apparatus comprising:
a housing forming a vacuum space;
a turntable for turning a master disk in the housing;
a head having at least one cold-cathode emitter element for, when driven, irradiating an electron beam toward the master disk; and
drive means for driving the cold-cathode emitter element in accordance with a supplied record information signal.

8. An disk manufacturing apparatus according to claim 7, wherein the head has a plurality of cold-cathode emitter elements arranged two-dimensionally within a plane normal to a rotational axis of the turntable.

9. An disk manufacturing apparatus according to claim 7, wherein the head has four cold-cathode emitter elements arranged in such a way that centers of the four cold-cathode emitter elements are located on four corners of a square.

* * * * *